United States Patent [19]

Berlin

[11] Patent Number: 5,774,254
[45] Date of Patent: Jun. 30, 1998

[54] FAULT TOLERANT LIGHT MODULATOR DISPLAY SYSTEM

[75] Inventor: Andrew A. Berlin, San Jose, Calif.

[73] Assignee: Xerox Corporation, Stamford, Conn.

[21] Appl. No.: 883,846

[22] Filed: Jun. 26, 1997

[51] Int. Cl.[6] ........................................................ G02F 1/03
[52] U.S. Cl. .......................... 359/259; 359/224; 359/291; 359/292; 345/84; 348/771
[58] Field of Search ................................... 359/245, 259, 359/290, 291, 292, 293, 295, 298, 224, 315, 316, 318; 345/84, 85; 348/770, 771

[56] References Cited

U.S. PATENT DOCUMENTS

| | | | |
|---|---|---|---|
| 4,615,595 | 10/1986 | Hornbeck | 359/291 |
| 5,231,388 | 7/1993 | Stoltz | 340/783 |
| 5,457,566 | 10/1995 | Sampsell et al. | 359/292 |
| 5,490,009 | 2/1996 | Venkateswar et al. | 359/291 |
| 5,491,680 | 2/1996 | Pauli | 369/112 |
| 5,517,347 | 5/1996 | Sampsell | 359/224 |
| 5,526,172 | 6/1996 | Kanack | 359/291 |
| 5,535,047 | 7/1996 | Hornbeck | 359/295 |
| 5,592,188 | 1/1997 | Doherty et al. | 345/84 |
| 5,592,239 | 1/1997 | Hara et al. | 348/771 |
| 5,612,713 | 3/1997 | Bhuva et al. | 345/84 |

OTHER PUBLICATIONS

Journal of Vacuum Science Technology, B, vol. 12, No. 6(Jeffrey B. Sampsell, "Digital Micromirror Device and Its Application to Projection Displays", Nov./Dec. 1994, pp. 3242–3246).

*Primary Examiner*—Loha Ben
*Attorney, Agent, or Firm*—Robert A. Burtzlaff

[57] ABSTRACT

A display system attached to a fixed substrate includes a two-dimensional light modulator array having a plurality of light modulators arranged in a first row and a second row, with the first row at a first row position with respect to the fixed substrate and the second row at a second row position with respect to the fixed substrate. A mechanically movable element such as a rotary stepper or piezovibrator attaches the two-dimensional light modulator array to the fixed substrate. The movable element is operated to move the first row from its first row position to substantially occupy the second row position. In conjunction with various image processing deblurring and rescaling techniques, this effectively distributes light between adjacent rows to compensate for failure of one or more light modulators in a row.

14 Claims, 7 Drawing Sheets

FAULT TOLERANT LIGHT MODULATOR DISPLAY SYSTEM

FIELD OF THE INVENTION

The present invention relates to two-dimensional reflective or transmissive pixel array display systems. More particularly, the present invention relates to fault correction for non-working or damaged pixels of such light modulator arrays.

BACKGROUND AND SUMMARY OF THE INVENTION

High resolution display systems based on discrete two-dimensional arrays of reflective or transmissive elements (visually recognized as "pixels") are used in portable computers, LCD multimedia projectors, high definition televisions, flat panel displays, and virtual reality eyewear. As compared to conventional scanning or projection devices (e.g. cathode ray tubes or video projectors), such devices operate at low voltages, making them power efficient, and generally do not require long optical paths for operation, making them space efficient.

However, widespread adoption of such devices for consumer display systems has been hindered by low manufacturing yields. A typical two-dimensional array (using, for example, LCD's that control light transmission or micromirrors that control light reflection) may have a million or more discrete elements, with failure of only two or three elements making the display system useless. Even worse, initially operable two-dimensional arrays may degrade in performance due to pinpoint screen damage, electronic failures, or mechanical wear and stiction problems. Particularly worrisome are display driver or mounting defects that can cause entire rows or columns of elements in the two dimensional array to simultaneously fail.

What is needed is an apparatus and technique for providing fault tolerance in two-dimensional light modulator arrays of reflective or transmissive elements used in display systems. Fault tolerance should allow for failure of single display elements, multiple display elements, or even failure of multiple rows or columns of display elements without appreciably diminishing display quality. Preferably, fault correction in such a fault tolerant system can be accomplished dynamically, and failure of array elements may even be corrected in real time.

The present invention provides such a fault tolerant system having a two-dimensional light modulator array mounted on (or movable relative to) a fixed substrate. The light modulator array has a plurality of light modulators arranged in a first row and a second row, with the first row at a first row position with respect to the fixed substrate and the second row at a second row position with respect to the fixed substrate. A movable element attaches the two-dimensional light modulator array to the fixed substrate, and can include, for example, piezovibrators, one or two-dimensional mechanical steppers, rotary steppers, or other conventional mechanisms for mechanically moving the light modulator array with respect to the fixed substrate. In operation, the movable element physically moves the first row from its first row position to substantially occupy the second row position, effectively spreading light between operating elements of the light modulator array and failed elements. As will be appreciated, multiple rows can be displaced, with light being spread over three, four, or even more rows if desired. In conjunction with a light modulator failure compensation system having an image rescaling module to reduce apparent light modulator display intensity for selected display elements, and a light source intensity control for increasing intensity of a variable intensity light beam, compensation for multiple element failures, or even failures of entire rows, is possible.

Physical displacement of a light modulator array is not required for practice of the present invention. An alternative failure compensation mechanism using optical row displacement techniques includes a display system having a light source, a display surface, and a two dimensional light modulator array with a plurality of light modulators arranged in a first row and a second row to modulate light from the light source. Light modulated by the first row is presented as a first row of pixels on the display surface, and light modulated by the second row is presented as a second row of pixels on the display surface. One or more optical elements redirect first row modulated light from its presentation as the first row of pixels on the display surface to substantially occupy the second row of pixels on the display surface. In preferred embodiments, this optical element can be a movable mirror in an optic path between the display surface and the two-dimensional light modulator, however alternative mechanisms for optical row displacement can also be used. Such mechanisms may include, for example, use of two or more optical elements, each optical element having a light shutter, with a light path from each optical element to the display surface being alternately closable by each respective light shutter. In certain embodiments, the use of mechanical row displacement in conjunction with optical row or column displacement is also contemplated.

Two dimensional row and column displacement by various mechanical or optical mechanisms is also within the scope of the present invention. For example, light modulators arranged in a first column and a second column can be positioned substantially orthogonal to the first row and second row, with the first column at a first column position with respect to the fixed substrate and the second column at a second column position with respect to the fixed substrate. The movable element can then displace (mechanically or optically) the first column from its first column position to substantially occupy the second column position, as well as providing for row displacement for two-dimensional movement. For example, the same virtual pixel can result from the periodic display of four physical pixels that are sequentially moved into position by displacement of the physical pixel array one pixel leftward, one row upward, one column rightward, and one row downward back to the original position.

In operation, compensating for faults generally requires that each light modulator in a physical pixel array for displaying an image have substantially the same defined length to present a virtual pixel array with identical pixel sizes. The physical pixel array is moved by mechanical, optical, or opto-mechanical techniques that cause periodic displacement of the physical array of light modulators through at least the defined length of each of the light modulators with a periodicity generally exceeding about $\frac{1}{10}$ of a second. Image processing software or firmware in the light modulator failure compensation system can correct for failure of one or more of the plurality of light modulators by shifting image position in coordination with periodic displacement of the light modulator array (physical array), and rescaling apparent light modulator display intensity for at least some light modulators positioned adjacent to a failed light modulator.

As an example, consider a light modulator array (physical array) that periodically moves through a distance corresponding to the length of a single light modulator. On average (ignoring travel time), each light modulator spends half of its time in an original position displaying a first virtual pixel, and the other half in a second, adjacent pixel displaying a second virtual pixel. Uncorrected, to a viewer the image would appear to blur as the pixel image (with associated gray and color value) initially in the first pixel was now displayed in the first and second pixel. However, if the digital information sent to the physical array was periodically shifted one pixel in coordination with the movement of the physical array, to a viewer the virtual pixel array would remain unblurred, even though two adjacent physical pixels are actually together creating the virtual pixel. In other words, as each pixel was physically moved leftward one pixel, the pixel image being displayed was moved rightward by one pixel, causing each virtual pixel to appear to remain unchanged (and unblurred).

Now, to correct for pixel failures the rescaling modulator selectively varies image intensity of at least those pixels adjacent to, or in the vicinity of, a failed pixel. By appropriate image display intensity adjustments (to all or some of the pixel elements in the physical pixel array), the image intensity can be varied over the whole (or part) of the light modulator array to maintain (or at least approximate) a correct relative image intensity for each virtual pixel in the array. In effect, image brightness of the light modulator array is reduced (in whole or in part) to eliminate or reduce point or line failure defects in light modulator arrays. If the light modulator array is used to reflect or transmit light from a variable light intensity source, compensation for loss of image brightness is possible by simply increasing brightness of the light intensity source. However, as will be appreciated by those skilled in the art, because of greater viewer acceptance of generalized or localized brightness variations as compared to point or line defects, use of a variable intensity light source may not be required to satisfy viewer expectations. In such situations, selective image display intensity adjustments in the region of the failed pixels, with minimal or negligible corrections to far removed regions (for example, those regions positioned ten to a hundred pixels away from the failed pixel) may provide sufficient failure compensation for ordinary viewers of the display.

In certain other embodiments of the present invention, fault correction can employ redundant rows or arrays that are optically or physically moved into position to fully or partially replace defective rows in a two-dimensional light modulator array. For example, a display system having a light source and a display surface (which can include a reflective screen, transmissive screen, or even a human eye by use of direct retinal scanning) is used to display an image produced by a two dimensional light modulator array in an optical path between the light source and the display surface. The two dimensional light modulator array has a plurality of light modulators arranged in rows to modulate light from the light source, with at least one row having light modulators susceptible to failure. A redundant light modulator array having a second plurality of light modulators arranged in at least one row can be used to modulate light from the light source, with its light ordinarily being reflected away from the display surface, absorbed, or otherwise made non-perceptible (for example, by shuttering to prevent light hitting the redundant light modulator array). However, if one or more light modulators fail, an optical element (such as a mirror, shutter, etc.), is operated to selectively direct light incident on the redundant light modulator array toward the display surface to substitute for at least one failed light modulator in the row of light modulators in the two-dimensional light modulator array. Such a system advantageously allows for effectively replacing one light modulator, one or more rows of the two-dimensional light modulator, or even large portions of the two dimensional light modulator with appropriately sized redundant light modulators. As will be appreciated, redundant multiple rows edging (or surrounding) a two dimensional light modulator array can be moved by a movable element to replace edge positioned light modulators. In certain embodiments, it is contemplated to combine movable elements, redundant light modulator arrays, or even optical elements to provide various fault correction modes.

Because of ease of manufacture, predictable performance, and durability, arrays of microelectromechanical pivoting or deformable mirrors controllably movable in response to applied electrostatic or electromagnetic forces are preferred for reflective displays. Such mirror systems are commercially available from Texas Instruments as part of a Digital Mirror Device (DMD) color projection system. Alternatively, switchable diffractive light valves such as developed by Silicon Light Machines, Sunnyvale, Calif. may be used. In addition, displays based on ferroelectric, electroluminescent, or twisted nematic liquid crystals can also be used. Also suitable are displays that can directly switch to an appropriate transmissive gray level without requiring use of time resolved gray levels such as needed for bistable reflective devices. Generally any device capable of modifying gray levels with a frequency exceeding about 10 HZ, or more typically, with a frequency between about 100 HZ and 1000 Hz, whether directly in response to variable analog current such as with liquid crystals, or through time based techniques such as employed by digital micromirrors or diffractive light valves, can be used in the present invention.

Additional functions, objects, advantages, and features of the present invention will become apparent from consideration of the following description and drawings of preferred embodiments.

DETAILED DESCRIPTION OF THE INVENTION

Figure 1:
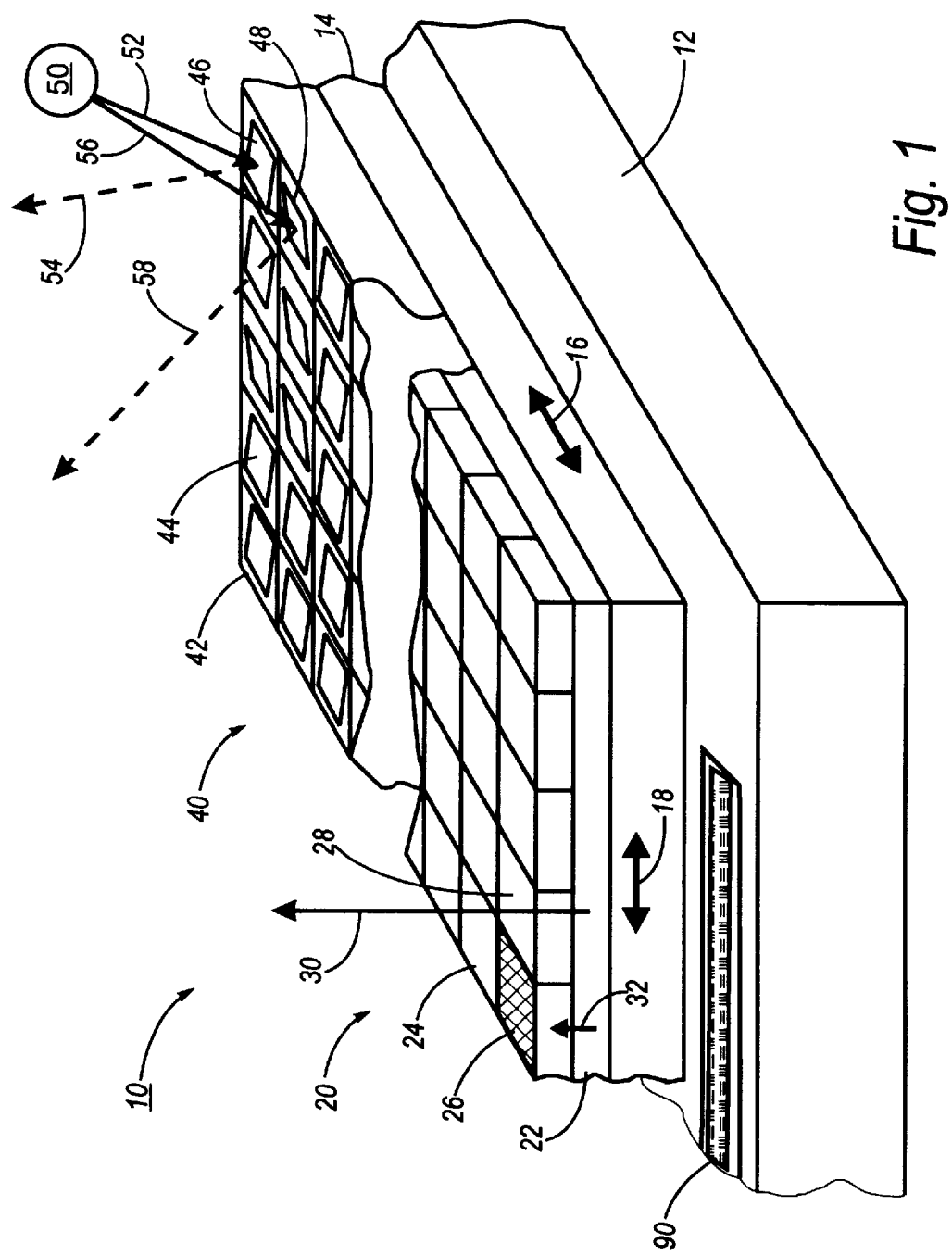
FIG. 1 is a schematic representation of an exemplary two-dimensional light modulator array attached to a fixed substrate by an intermediary movable element to allow for controlled physical displacement of the light modulators in row or column directions, with the light modulators being electrostatically actuated bistable mirrors or liquid crystal light absorbers/transmitters that modulate light projected from a light source.

FIG. 1 is a schematic, partially broken away view of a fault tolerant display system 10 capable of supporting mechanisms for mechanically or optically compensating for failed, defective, or intermittently operating pixels in a display. For teaching purposes, FIG. 1 illustrates both a transmissive display system 20 and a reflective display 40 supported by a movable element 14 on a common fixed substrate 12. As shown, the transmissive display system 20 includes a row and column array 24 of light transmissive display elements 28 to selectively transmit or absorb light from a light source 22, while the reflective display system 40 includes a row and column array 42 of pivotal mirrors 44 that selectively alter reflective direction of light from light source 50. However, as will be appreciated, a given display will usually contain either transmissive elements (such as a conventional active matrix LCD projector, LCD display, or ferroelectric fluid display) or reflective elements (such as a digital micromirror disclosed, for example, in U.S. Pat. No. 5,535,047 to Hornbeck), although certain embodiments may combine transmissive and reflective elements for operation (e.g. a stacked transmissive/reflective display using LCD's and a selectively deformable sheet mirror as discussed later in connection with FIG. 10).

In operation, each display element 28 in the light transmissive display system 20 can be selectively controlled to absorb incident light or allow its transmission to an image sensor such as a viewer's eye (either directly or in conjunction with intervening projective optics, magnifiers, or reflectors, not shown). In FIG. 1, absorption of an incident light ray 32 by an absorbing display element 26 is shown, as is transmission of an incident light ray 30 through a transmissive display element 28. Each display element in the display system is designed to switch between gray scale states in response to control signals sent by control electronics 90 (which can be patterned on the substrate through conventional electronic photolithographic techniques as illustrated, or as a separate control module interfaced with the display through appropriate control leads). As will be appreciated, various conventional light absorbers, ferroelectric fluid displays, LCD displays, or other known light display elements supporting at least two or more light transmissivity states (eg. 256 gray scale) can be used in the present invention.

Gray scale images can also be produced by controlling the bistable position of each pivotal mirror 44 in the light reflective display system, with each mirror selectively controlled to reflect incident light to an absorber (not shown) or allow its transmission to a viewer's eye (again, either directly or in conjunction with intervening projective optics, magnifiers, or reflectors, not shown). In FIG. 1, ray 58 illustrates reflection of an incident light ray 56 from light source 50 toward an absorber (not shown) using a mirror 48 pivoted through some angle. Reflection of an incident light ray 52 from light source 50 toward a viewer (or projective optics, not shown) is illustrated by light ray 54 reflected from an oppositely tilted mirror 46. A suitable position bistable mirror (operated with electrostatic actuators) for the present invention is described in U.S. Pat. No. 5,535,047 to Hornbeck, the disclosure of which is hereby expressly incorporated by reference. As will be appreciated, alternative reflective display systems can be employed, including deformable mirrors, mirrors operated with electromagnetic actuators, or any other conventional reflective system known to those skilled in the art. As with display 20, switching between light absorbing and light reflecting can again be controlled using control electronics 90.

Switching speed for display elements of any of the foregoing devices will generally be in the millisecond, microsecond, or even nanosecond range, depending on the particular display architecture. Advantageously, use of high speed switching techniques in conjunction with inherent temporal smoothing of a viewer's eye (or other light integrative image sensor) allows for generation of gray levels using high speed switched bistable devices (stable reflective/ transmissive or non-reflective/absorptive), with the portion of time that each display element is switched to reflect or transmit light being proportional to the perceived gray level. For example, if the critical light flicker fusion frequency for a viewer is about 60 Hz, a display element switchable at 6 KHz could switch about a 100 times between a light reflective and a non-reflective state without appearing to flicker. By adjusting the proportion of time in each reflective/non-reflective display state, the bistable display element can be used to generate a gray level display. By use of colored light sources and such high speed switching it is even possible to use generate full color displays such as disclosed, for example, in U.S. Pat. No. 5,592,188 to Doherty et al., assigned to Texas Instruments, Inc. Alternatively, systems of colored filters can be used to provide color, as well as gray level displays.

Unfortunately, in practice it is difficult to manufacture large arrays having hundreds of thousands, or even millions, of the foregoing high switching speed display elements without at least some individual display elements being uncontrollable through mechanical or electrical failure. To compensate for such failures, one embodiment of the present invention includes a mechanism to physically displace rows or columns in the display array in response to signals sent by control electronics 90. As illustrated in FIG. 1, this mechanism can include the movable element 14, a piezovibrator capable of independently moving in two orthogonal directions as shown by arrows 16 and 18. In alternative embodiments the movable element can be a one-dimensional piezovibrator, a movable linear stage, an angular arm, or any other conventional mechanism for periodically moving transmissive system 20 (or system 40) through a distance. Movement is generally through a distance corresponding to integral multiples of each row or column distance in the array 24 or array 42. For example, in one embodiment, the movable element 14 can physically move a certain distance sufficient to allow each row in the array 42 to occupy for a brief time the position of an adjacent row. Alternatively, in addition to adjacent rows, the movable element 14 can be operated to periodically displace each row in the array 24 (or array 42) by two, three, or more rows with respect to its initial starting position with respect to the fixed substrate 12. As an extension to one-dimensional movement, and as illustrated with respect to FIG. 1, the movable element can displace an array 24 (or array 42) in a column direction, as well as in a row direction, to give full two-dimensional movement.

Compensation for failure of individual or multiple display elements in such a fault tolerant display 10 is best described in conjunction with FIGS. 2, 3, 4, and 5, which shows compensation for a single failed display element 124 in a schematically illustrated display 110. As will be appreciated, although the following description of operation of the present invention is based on a portion of a single row, pixel displacement can be arbitrary, with row displacement, column displacement, angular displacement, displacement in pixel blocks (using, for example, combinations of row and column displacement) being used. All functioning display elements are shown in a light transmissive (or light reflective) state, with the failed display element 124 being in a light absorptive (or light non-reflective) state. In addition, it will be appreciated that the present invention is not limited to substantially square or rectangular display pixels, with circular, elliptical, hexagonal, or other suitable geometries constituting contemplated embodiments of the present invention. Because of wide availability however, typically an array of rectangular display elements arranged in a rectangular grid are used (eg. 1024 rows by 768 columns of rectangular display elements).

Figure 2:
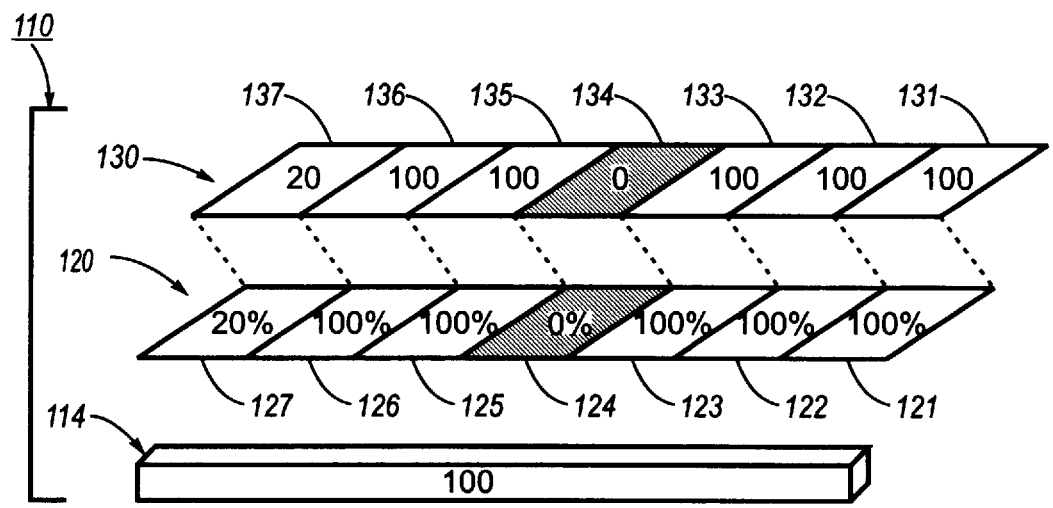
FIG. 2 schematically illustrates a gray scale light modulator array (physical array) for modulating a variable intensity light source, with the light modulator displaying a virtual pixel array, with a single defective light modulator resulting in a dark display pixel.

For ease of illustration, in FIG. 2 only a portion of a single row of display 110 in the vicinity of the failed display element 124 is shown. The display 110 can be transmissive, reflective, emissive, a combination of transmissive and reflective, or any other display architecture able to provide high speed gray scale adjustment to individual pixels. The display 110 will typically include a two-dimensional array of display elements for transmissive or reflective display of an image. To aid in understanding the present invention, FIGS. 2 through 5 show a variable light intensity source 114 and a one-dimensional partial section of a two-dimensional physical pixel array 120 consisting of an array of display elements 121–127 (including failed display element 124). As will be appreciated, even though the following discussion is made in terms of gray levels, by use of fixed or movable colored filters, colored emissive displays, or other suitable color producing mechanism, correction of faulty colored display elements is within the scope of the present invention.

Display elements 121–126 are each controlled to display a white pixel in the absence of unintended display element failures, while display element 127 is controlled to provide a gray pixel (e.g. by time modulation of bistable reflective or transmissive elements, or direct gray scale presentation with LCD's). The display elements 121–127 collectively provide a virtual pixel array 130 consisting of the pixel image of display elements 131–137 developed by application of the variable intensity light source 114 to the physical pixel array 120. The intensity of the light source is indicated within the variable light intensity source 114 (intensity 100 in FIG. 2, in arbitrary units), the percentage transmissivity/reflectivity of each display element 121–127 is respectively indicated (eg. 0%, 50%, 100%), and the perceived gray level of the virtual pixel array 130 shown (on a scale of 0 to 100, with 100 being the brightest and 0 being black). In effect, the virtual pixel array 130 is what a viewer would see when looking at the display, even if the physical pixel array 120 is undergoing high speed movement in conjunction with image processing driven pixel intensity remapping as discussed in conjunction with FIGS. 3–5.

Figure 3:
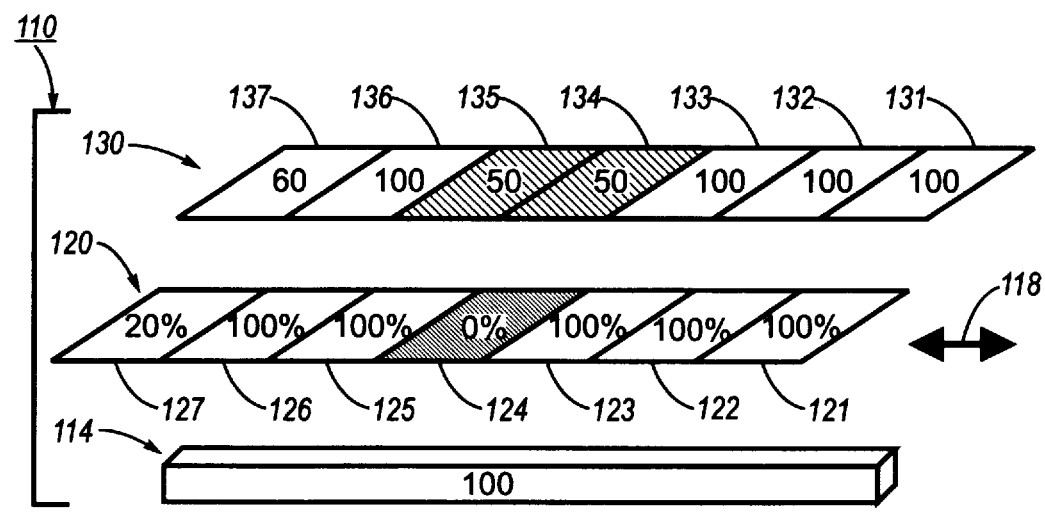
FIG. 3 schematically illustrates the light modulator array of FIG. 2 physically displaced by a single column to effectively share light between the dark display pixel and adjacent pixels.

As can be seen by inspection of FIG. 2, display element 124 of the physical pixel array 120 has failed, so that the virtual pixel array 130 has a corresponding dark pixel element 134. However, if the failure of display element 124 can be determined, remedial measures to mitigate or entirely correct the failure can be employed. As seen in FIG. 3, the light modulator array of FIG. 2 can be physically displaced by a single column to effectively share light (through time averaging) between the dark display pixel 134 of the virtual pixel array 130 and an adjacent pixel 135. The physical displacement is both high speed and oscillatory, with the physical pixels being displaced one column and returned to their original position several tens, hundreds, thousands, or even tens of thousands times each second. In a typical embodiment of the invention, oscillations on the order of 30 to 100 Hz are generally suitable. Absent any image processing, the virtual pixel array 130 now does not have a single dark pixel 134, but instead blurs the array to have two gray pixels 134 and 135, each virtual pixel having a gray level of 50 instead of the desired gray level of 100. In addition, the originally gray pixel 137 (having an original gray level of 20 derived from pixel 127 as seen in FIG. 2) derives half of its share of light with the adjacent physical pixel element 126, brightening the virtual display pixel element 137 from a gray level of 20 to a gray level of 60 (20%+100% divided by 2 to equal 60% light transmission/reflection/transmission).

Figure 4:
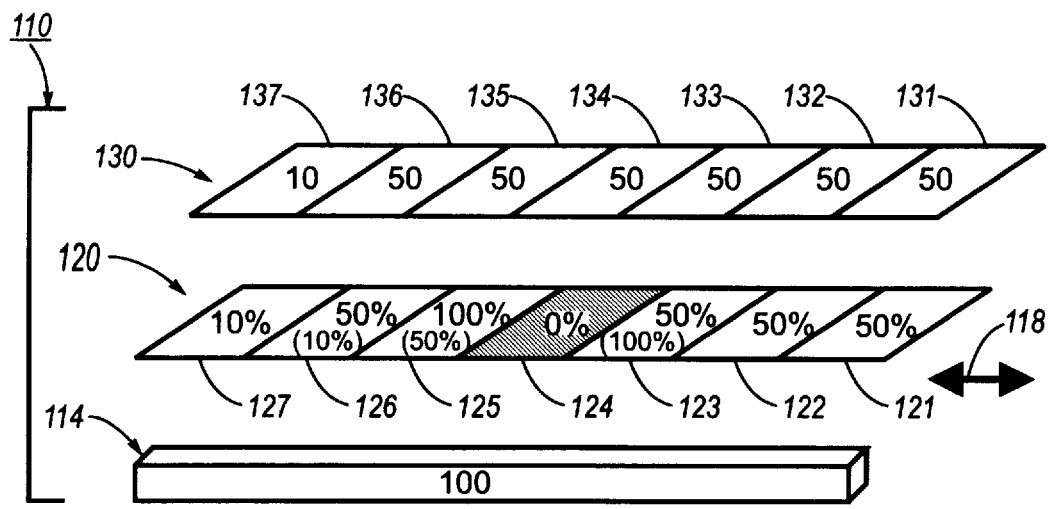
FIG. 4 schematically illustrates the light modulator array of FIG. 3 after image rescaling to adjust image intensity of remaining pixels to match the shared greyscale intensity of the dark display pixel and the adjacent pixel.
Figure 5:
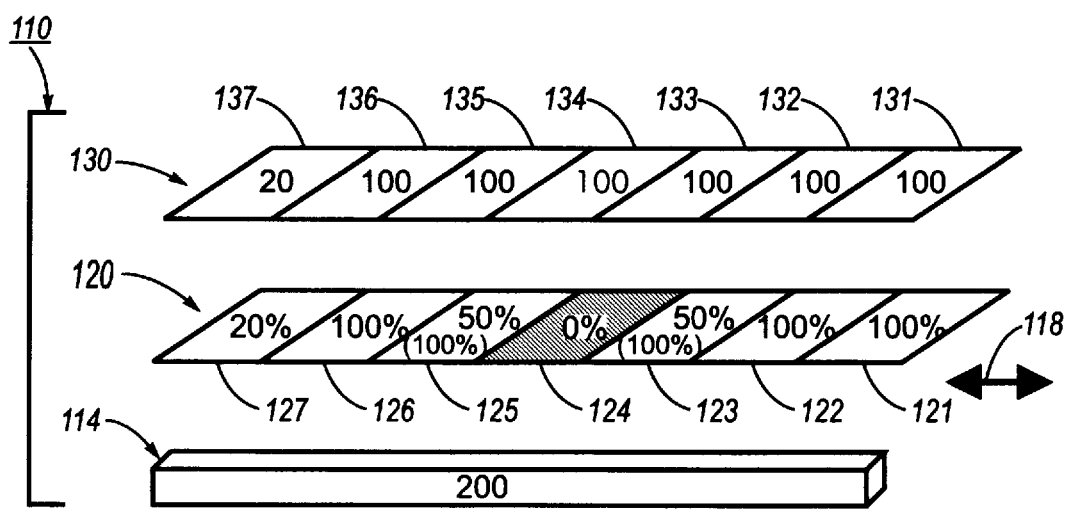
FIG. 5 schematically illustrates the light modulator array of FIG. 4 after light intensity rescaling to provide a desired greyscale intensity approximating the gray scale background of FIG. 2.

Providing a deblurred, rescaled image with the proper relative gray scale for a virtual pixel display elements is schematically illustrated in FIG. 4. As seen in FIG. 4, image grayscale of pixels 121, 122, 126, and 127 are scaled down to 50 to match the shared grayscale intensity of the dark display pixel and the adjacent pixel. To prevent unwanted brightening of virtual pixel element 133, pixel 123 is scaled to have a grayscale intensity of 50 while physically in a position that provides virtual pixel 133, and a gray scale intensity of 100 when moved one column leftward into the position that generates virtual pixel 134. Similarly, pixel 125 is scaled to have a grayscale intensity of 100 while physically in a position that provides virtual pixel 135, and a gray scale intensity of 50 when moved one column leftward into the position that generates virtual pixel 136. As a result, the virtual pixel array 130 now displays a uniform grayscale intensity of 50 for each pixel element 131–136. In addition, to provide a correct gray scale for virtual pixel 137, pixel 126 must be scaled to have a grayscale intensity of 50 while physically in a position that provides virtual pixel 136, and a gray scale intensity of 10 when moved one column leftward into the position that generates virtual pixel 137. As seen in FIG. 5, this rescaled image (with elements 131–136 having a perceived grayscale of 50, and element 137 having a perceived gray scale of 10) is corrected for brightness by doubling (100 to 200) the light intensity of the light intensity source 114. This brings the perceived gray level back to the target value of 100 for pixels 131–136 (and 20 for pixel 137) in the virtual pixel array 130.

Figure 6:
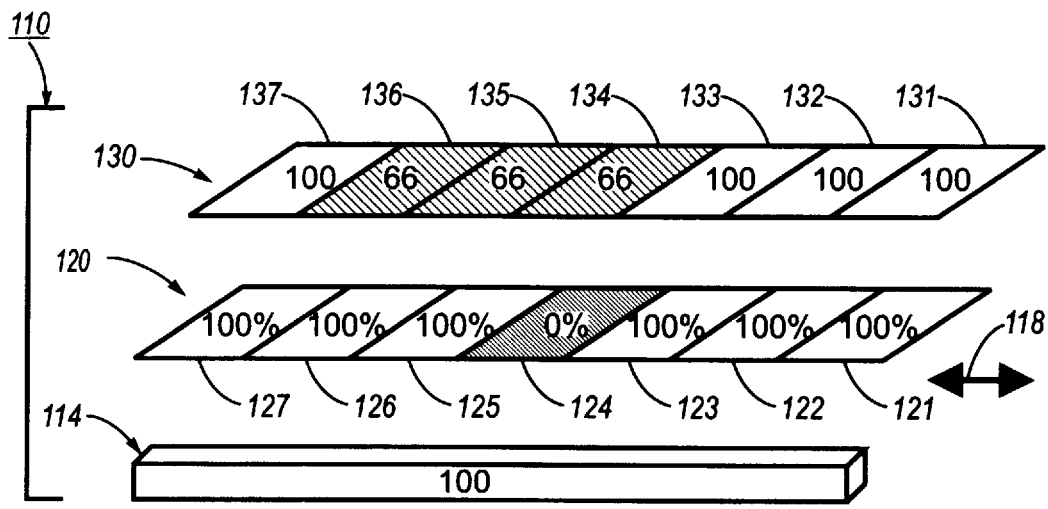
FIG. 6 illustrates a light modulator array physically displaced by multiple columns to effectively share light between the dark display pixel and several adjacent pixels.

As will be appreciated, oscillatory movement of a physical pixel array 120 is not limited to single pixel displacements. FIG. 6, which substantially corresponds to the embodiment of the invention illustrated in FIG. 3, shows displacement of the physical pixel array 120 by three pixel elements. In contrast to the embodiment illustrated in FIGS. 2–5, the target value of all pixel elements in FIG. 6 is 100, with the single failed pixel having a gray level of 0. The shown displacement allows light from a single failed modulator to be spread among three pixels, decreasing the required intensification of the light intensity source 114 to bring the perceived level back to its target gray level value of 100. In certain embodiments, oscillatory pixel displacement can correspond to five, ten, or more columns (or rows) using suitable actuators and pixel arrays having a suitably high switching speed.

Figure 7:
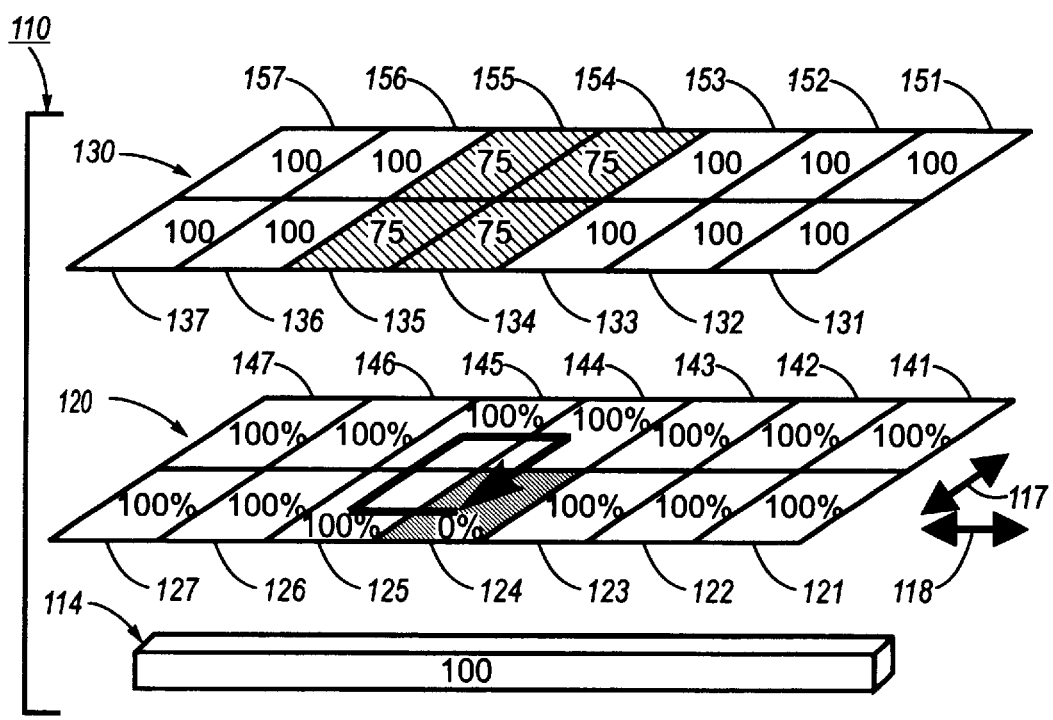
FIG. 7 is a light modulator array physically displaced by in two dimensions (such as the illustrated rectangular movement) to effectively share light between the dark display pixel and several row and column adjacent pixels.

In yet another embodiment of the invention, oscillatory movement can be two dimensional. As seen in FIG. 7, which substantially corresponds to the embodiment of the invention illustrated in FIG. 3, shows displacement of the physical pixel array 120 in two dimensions. Movement is by sequential and repeated column displacement of one pixel leftward, one row upward, one column rightward, and one row downward back to the original position. Again, the target value of all pixel elements is 100, with the single failed pixel having a gray level of 0. This two dimensional displacement allows light from a single failed modulator to be spread among four adjacent pixels, decreasing the required intensification of the light intensity source 114 to bring the perceived level back to its target gray level value of 100. In certain embodiments, oscillatory pixel displacement can be varied to have other oscillatory patterns. For example, movement could be by sequential and repeated column displacement of ten pixels leftward, one row upward, ten columns rightward, and one row downward back to the original position, to provide a high aspect rectangular pixel displacement orbit (as compared to the square orbit of FIG. 7). Other repeating patterns can of course be employed as desired.

Figure 8:
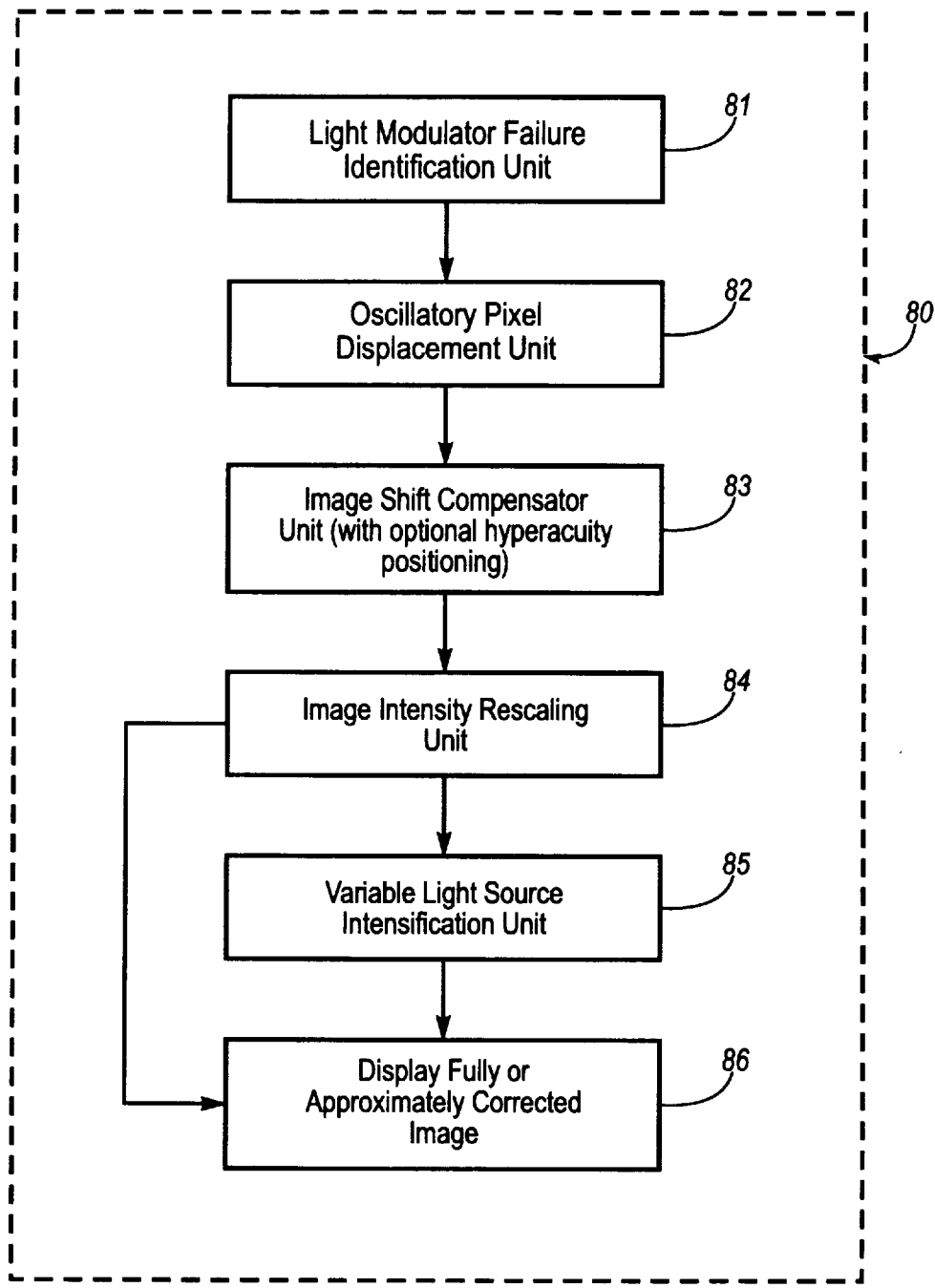
FIG. 8 is a flowchart schematically illustrating modules used for implementing a light modulator failure compensation system.

To aid in understanding the present invention, the foregoing image processing and display mechanisms are schematically illustrated with reference to FIG. 8. In operation, a light modulator failure compensation system 80 requires a light modulator failure identification unit 81 to identify malfunctioning light modulators (physical pixels in a one or two-dimensional physical pixel array). Failure identification can be a one-time electronic or optical inspection at a manufacturing facility, or more preferably can be made "on the fly" during device warm-up or operation. Optical identification can be as simple as inspecting an array to see which element is anomalously bright (or dark). Electronic identification can rely on addressing each light modulator to switch optical states (gray levels) while simultaneously measuring capacitance, resistance, or any other suitable electrical switching response properties, with failures being identified by inappropriate electrical responses. For example, an electrostatically actuated micromirror held in a non-reflective state by stiction, damaged supports, or blocking debris would not report a normally expected capacitance change during switching, allowing it to be identified as a failed light modulator.

If any light modulators have failed, the oscillatory pixel displacement unit 82 is utilized to distribute light from two or more physical pixels to each respective virtual pixel in a virtual pixel array seen by a viewer. The physical pixel array is moved by mechanical (as seen in FIGS. 4–7), optical (as seen in the following FIG. 9), or opto-mechanical techniques (as seen in the following FIG. 10) that cause periodic displacement of the physical array of light. The extent, directionality, speed, and path of physical pixel array movement can be controlled by on-board or external digital or analog controllers, and can be optionally adjusted to provide for better image compensation. For example, a one-dimensional movement of the physical pixel array with a two or three pixel movement shift may be initially adequate for light distribution. However, as additional light modulators fail, two-dimensional movement at a higher speed may be required to provide adequate image quality.

Positional and velocity information from the light modulator failure identification unit 81 and the oscillatory pixel displacement unit 82 is passed to image processing software or firmware in the image shift compensator 83. Again, the software can be onboard (directly formed on the substrate as seen in FIG. 1), or can be a separate memory and logic module (digital or analog) connected to the oscillatory pixel displacement unit and the electronics necessary for driving pixel image display. The compensator 83 is used to shift image position in coordination with periodic displacement of the oscillatory pixel displacement unit 82. In operation, the digital information used to provide a pixel image is periodically shifted one or more pixels in coordination with the movement of the physical array, so that two or more physical pixels together create a virtual pixel. For example, as each pixel was physically moved leftward two pixels, the pixel image display was moved rightward by two pixels, causing each virtual pixel to appear to remain unchanged (and unblurred), even though three physical pixels are actually providing light to a single virtual pixel.

As will be appreciated by those skilled in the art, the image shift compensator 83 can optionally provide for subpixel display precision using various hyperacuity techniques. For example, sub-pixel edge placement is enabled if specific light modulators are turned on not only while at integral pixel distance intervals, but for some amount of time while at a fractional distance from each integral pixel position. While generally requiring a higher frequency of oscillation of the physical array, hyperacuity techniques based on timing can arbitrarily increase effective display resolution, and are particularly useful for minimizing aliasing features that are easily detected by human viewers.

Information from units 81, 82, and 83, including any optional hyperacuity timing information, is passed to an image intensity rescaling unit 84. As previously described in connection with FIGS. 2–5, the rescaling unit 84 modifies some or all of the displayed gray levels of light modulators in the physical pixel array. The image intensity rescaling unit 84 controls this gray level adjustment, with those light modulators positioned adjacent to a failed light modulator generally having the greatest differential gray level adjustment, and/or requiring rapid switching of gray levels (depending on their physical pixel position relative to the virtual pixel).

The loss in overall brightness can optionally be corrected by use of a variable light source intensification unit 85 (corresponding to light source 50 of FIG. 1). Compensation for loss of image brightness is possible by simply increasing brightness of the light source intensification unit 85. Such brightness correction is easier if a large number of physical pixels provide each virtual pixel, with a 2:1 physical to virtual pixel ratio (such as discussed in connection with FIGS. 2–5) requiring a doubling of light source brightness, while a 10:1 ratio only requires about a 10% increase in brightness to provide a fully corrected image 86. As will be appreciated by those skilled in the art, because of greater viewer acceptance of generalized or localized brightness variations as compared to point or line defects, use of a variable light source intensification unit 85 may not be required to satisfy viewer expectations. In such a case, an approximately corrected image 86 will be displayed, with brightness losses in the vicinity of failed pixel elements being imperceptible or at least not bothersome to a viewer. In addition, the present invention contemplates selective image display intensity adjustments in the region of the failed pixels, with minimal or negligible corrections to far removed regions (for example, those regions positioned ten to a hundred pixels away from the failed pixel). Again, because of known limits to human visual perception, such limited compensation may provide adequate fault correction for viewers.

As will be appreciated, movement of the two-dimensional light modulator array (whether mechanical or optical) does not have to be exclusively through stepwise translation. Instead, movement may occur continuously over a distance of multiple pixels, with acceleration and deceleration occuring when a change of direction of motion is required. Such a continuous motion profile would result in the physical pixels occupying specific virtual pixel locations for different amounts of time. With appropriate modifications, the image shift compensator unit 83 can utilize information about the position and velocity of the effective array motion to determine the appropriate image shift and intensity corrections such as described in connection with FIG. 8. For example, an implementation which utilizes oscillatory translation over a distance of 20 pixels may have uniform velocity in the center of the oscillation, but will move slower at the endpoints. The image shift compensator can obtain information about the motion through position feedback, through velocity feedback, or through other means of prescribing motion, such as a constraining motion to be a function of time, and make corrections as necessary to display a deblurred image.

Figure 9:
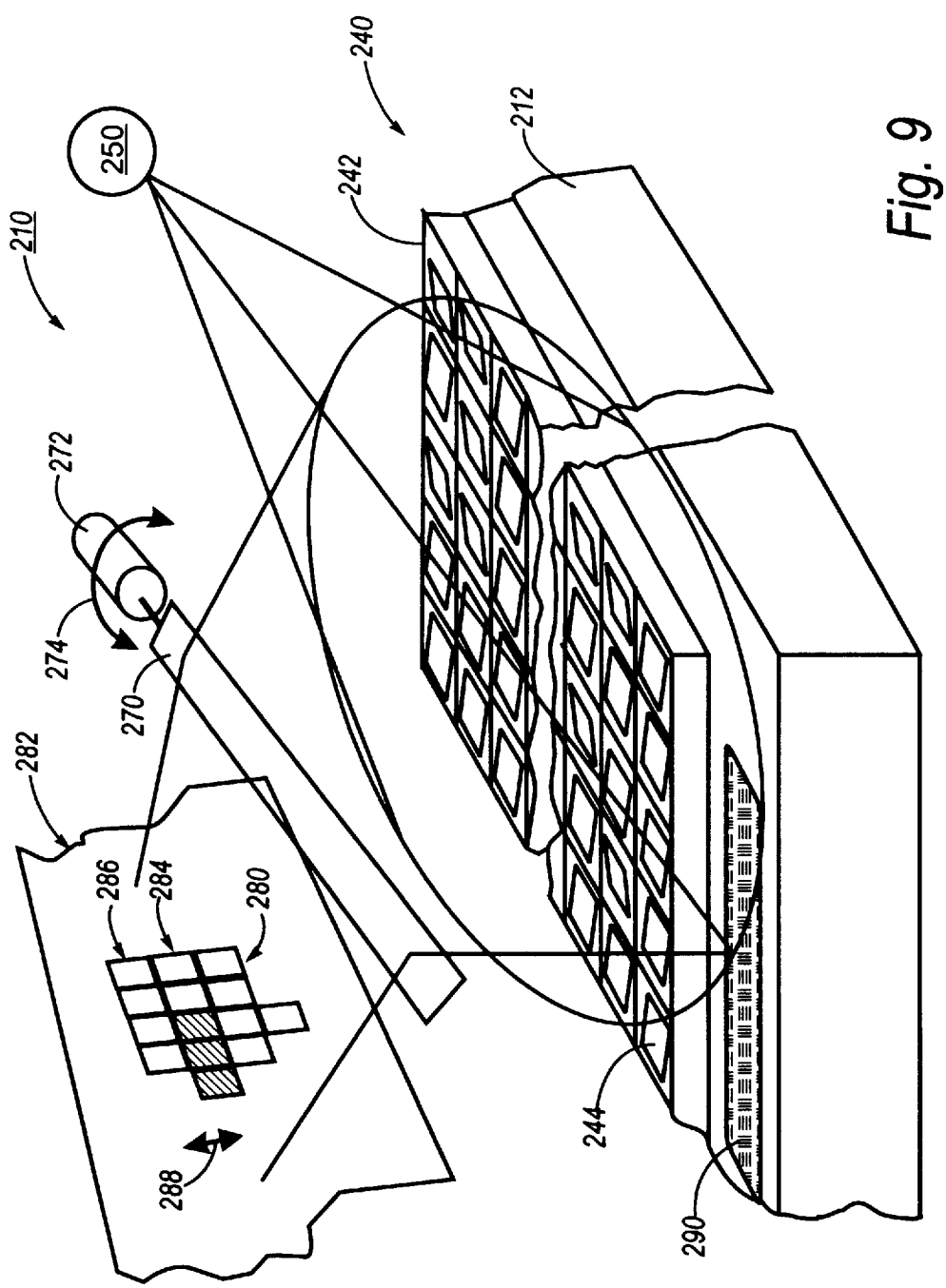
FIG. 9 illustrates an optical oscillatory pixel displacement system.

In addition to physically moving the array (such as discussed in connection with FIG. 1) to create a correspondence of two or more physical pixels to each virtual pixel, it is possible to create such a correspondence in conjunction with various optical or optomechanical techniques. For example, FIG. 9 illustrates a schematic, partially broken away view of a fault tolerant display system 210 capable of supporting mechanisms for mechanically or optically compensating for failed, defective, or intermittently operating pixels in a display. For teaching purposes, FIG. 9 illustrates a mirror based reflective display 240 having row and column physical arrays 242 of pivotal mirrors 244 fixedly mounted to rotate with respect to a substrate 212. However, as those skilled in the art will appreciate, various other reflective or transmissive display devices, including those discussed in connection with FIG. 1, can be used in the present invention.

In operation, a virtual gray scale pixel array image 280 on a screen 282 can be produced by controlling the bistable position of each pivotal mirror 244 in the physical array 242, with each mirror selectively controlled to reflect incident light to an absorber (not shown) or allow its transmission to screen 282 via a pixel image displacement mirror 270 (pivotably mounted on an actuator 272) either directly or in conjunction with intervening projective optics, magnifiers, or fixed reflectors (not shown). As shown in FIG. 9, an incident light beam 256 from light source 250 strikes the physical array 242 of light modulators, and is reflected in a desired image pattern toward mirror 270. The mirror 270 can be rotated (for example, at a 10 Hz, 100 HZ, 1000 Hz, or greater frequency) by an actuator 272 to displace the beam by a distance corresponding to one or more virtual pixels of the virtual gray scale pixel array image 280. Operation of actuator 272 for pivoting the mirror in direction 274 can be enabled in either one, two, or three dimensions by electrostatic attraction, electromagnetic attraction, a piezovibrator, a movable linear stage, an angular arm, or any other conventional mechanism for periodically effecting rotation or movement of mirror 270.

In a manner similar to that previously discussed in connection with FIG. 1, on-board control electronics 290 can be used for implementing various image processing module units previously described in connection with FIG. 8, including mirror fault identification, image rescaling, optional hyperacuity processing and control of mirror 270 for virtual pixel movement. Movement of mirror 270 is generally through a distance corresponding to integral multiples of each row or column distance in the virtual gray scale pixel array image 280. For example, in the illustrated embodiment, the mirror 270 can rotate a certain distance sufficient to allow each row 284 in the array 280 to occupy for a brief time the position of an adjacent row 286. As will be appreciated, by use of a two dimensional movement of mirror 270, full two-dimensional movement pixel displacement is also possible.

Figure 10:
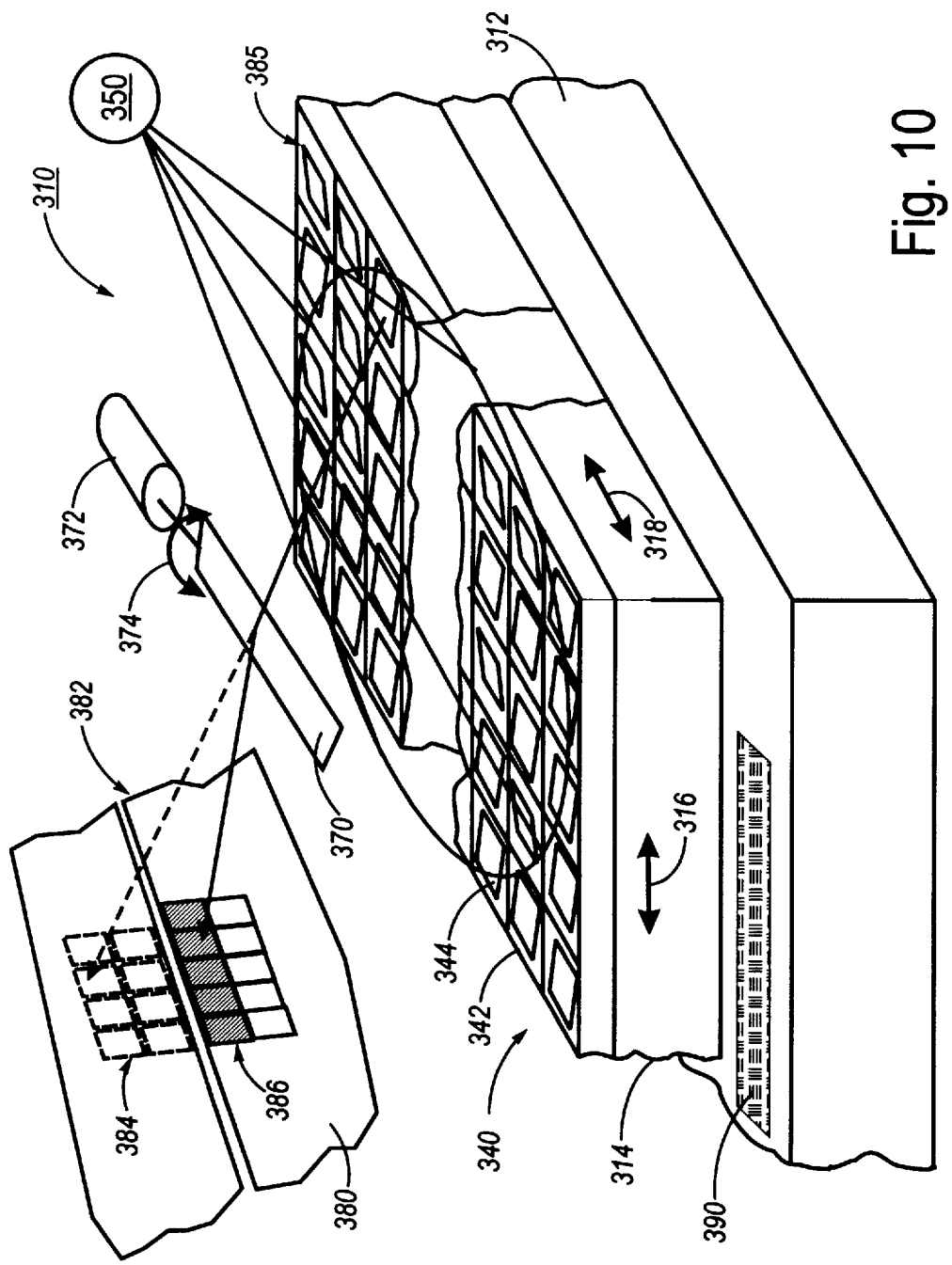
FIG. 10 illustrates an alternative fault tolerant light modulator array projection system having multiple redundant rows or columns to substitute for non-functioning light modulator rows or columns.

FIG. 10 illustrates yet another embodiment of the present invention for fault tolerant correction of damaged physical pixel arrays. Fault tolerant display system 310 supports redundant arrays 385 mounted on substrate 312 for mechanically or optically compensating for failed, defective, or intermittently operating pixels in a display. System 310 includes a mirror based reflective display 340 having a row and column physical array 342 of pivotal mirrors 344 mounted for bistable rotation with respect to a substrate 312. The reflective display 340 is further mounted on a movable element 314, similar to that discussed in connection with FIG. 1, for supporting oscillatory movement of array 342. As those skilled in the art will appreciate, various other reflective or transmissive display devices, including those discussed in connection with FIG. 1, can be used in the present invention. In addition, multiple redundant rows or columns are contemplated for operation of alternative embodiments of the present invention, with complete duplication of all rows or columns of physical array 342 being within the scope of the invention.

In operation, a virtual gray scale pixel array image 380 on a screen 382 can be produced by controlling the bistable position of each pivotal mirror 344 in the physical array 342 of light modulators, with each mirror selectively controlled to reflect incident light to an absorber (not shown) or allow its transmission to screen 382 to provide a virtual pixel array image 380. In the absence of any pixel defects, incident light beam 356 from light source 350 striking the redundant array 385 of light modulators is ordinarily reflected away from the screen 382. If there are a few point light modulator defects, the physical array 342 can be oscillated (by piezovibrator 314 in directions 316 and 318, for example) and subjected to various image processing techniques such as discussed in connection with FIG. 8 to provide adequate fault correction. However, if there are a great many adjacent light modulator failures in the physical array 342 resulting in non-operative virtual pixels (for example, those failed virtual rows 386), the foregoing described techniques may be unable to fully compensate for the faults.

Fortunately, the embodiment of the invention described in relation to FIG. 10 allows for large scale compensation of numerous row or column faults. A mirror 370 can be rotated in direction 374 by actuator 372 to map the reflected beam from the redundant array 385 from its initial virtual position (rows 384) onto the position of failed virtual rows 386. Like the embodiment of the invention discussed with reference to FIG. 9, operation of actuator 372 for pivoting the mirror can be enabled in either one, two, or three dimensions by electrostatic attraction, electromagnetic attraction, a piezovibrator, a movable linear stage, an angular arm, or any other conventional mechanism for periodically effecting rotation or movement of mirror 370. The mirror 370 can be fixed in position to direct a virtual pixel image from redundant rows to overlap rows of failed pixels. This can be a one time adjustment of mirror position, or more typically the mirror can be dynamically moved after operation of light modulator failure identification unit (such as described in connection with FIG. 8) to create an overlap of the redundant virtual pixels and the failed virtual pixels. In certain embodiments of the invention, large numbers of redundant rows, including as many redundant rows as are present in the physical array 342, can be positioned beside the physical array. In practice, two highly defective physical arrays can be positioned to project an overlapping virtual array, with the second physical array turning on (when required) only those pixels that are positioned to replace failed pixels in the first physical array. Such an embodiment of the present invention allows two costly, yet defective, physical arrays to cooperate to emulate a non-defective array. Since failure rates currently approach 80% to 90% for many varieties of high pixel density physical arrays, the present invention of combining two defective physical arrays can be cost effective.

As seen in FIG. 10, overlapping virtual projections from redundant rows and the physical array can be employed in conjunction with an oscillatory fault compensation mechanism such as describe in connection with FIGS. 1–8. In those situations where the physical array 342 of light modulators is oscillating in directions 316 or 318 (as a result of operation of piezovibrator 314), the mirror 370 can be rotated in one or two dimensions to track oscillatory movement of the physical array, in a manner similar to that described in connection with FIG. 9. This allows large scale row defects to be completely compensated for by virtual projections of redundant arrays, while isolated pixel failures can be corrected for using oscillatory movement and image processing such as discussed in connection with FIGS. 1–8. In addition, as those skilled in the art will appreciate, oscillatory movement allows for straighforward replacement of failed pixels on an array edge. For example, the physical array can be surrounded by ten or twenty rows (or columns) of redundant arrays that are transiently moved into position to provide replacement virtual pixels.

As those skilled in the art will appreciate, other various modifications, extensions, and changes to the foregoing disclosed embodiments of the present invention are contemplated to be within the scope and spirit of the invention as defined in the following claims.

What is claimed is:

1. A display system attached to a fixed substrate, the display system comprising a two-dimensional light modulator array having a plurality of light modulators arranged in a first row and a second row, with the first row at a first row position with respect to the fixed substrate and the second row at a second row position with respect to the fixed substrate, and a movable element attaching the two-dimensional light modulator array to the fixed substrate, with the movable element moving the first row from its first row position to substantially occupy the second row position.

2. The display system of claim 1, wherein the plurality of light modulators controllably transmit and absorb light.

3. The display system of claim 1, wherein the plurality of light modulators selectively reflect light.

4. The display system of claim 1, wherein some of the plurality of light modulators are arranged in a first column and a second column positioned substantially orthogonal to the first row and second row, with the first column at a first column position with respect to the fixed substrate and the second column at a second column position with respect to the fixed substrate, and wherein the movable element moves to bring the first column from its first column position to substantially occupy the second column position.

5. The display system of claim 1, wherein the movable element moves the two-dimensional light modulator array through at least two rows.

6. The display system of claim 1, wherein the movable element further comprises a piezoreactive material.

7. A fault tolerant display system comprising a fixed substrate, a light source for producing a variable intensity light beam, a two-dimensional light modulator array positioned to intercept the variable intensity light beam from the light source, the two-dimensional light modulator array having a plurality of light modulators arranged in a first row and a second row, with the first row at a first row position with respect to the fixed substrate and the second row at a second row position with respect to the fixed substrate, a movable element attaching the two-dimensional light modulator array to the fixed substrate, with the movable element moving the first row from its first row position to substantially occupy the second row position, and a light modulator failure compensation system for correcting for failure of at least one of the plurality of light modulators, the light modulator failure compensation system having an image rescaling module to vary apparent light modulator display intensity, and a light source intensity control for increasing intensity of the variable intensity light beam.

8. The display system of claim 7, wherein the plurality of light modulators controllably transmit and absorb light.

9. The display system of claim 7, wherein the plurality of light modulators selectively reflect light.

10. The display system of claim 7, wherein some of the plurality of light modulators are arranged in a first column and a second column positioned substantially orthogonal to the first row and second row, with the first column at a first column position with respect to the fixed substrate and the second column at a second column position with respect to the fixed substrate, and wherein the movable element moves to bring the first column from its first column position to substantially occupy the second column position.

11. The display system of claim 7, wherein the movable element moves the two-dimensional light modulator array through at least two rows.

12. The display system of claim 7, wherein the movable element further comprises a piezoreactive material.

13. A fault tolerant display system comprising a light modulator array having a plurality of light modulators, each light modulator having a defined length, the light modulator array being movable with respect to a fixed substrate, a movable element attaching the light modulator array to the fixed substrate, with the movable element periodically displacing the light modulator array through at least the defined length of each of the light modulators with a frequency exceeding about $\frac{1}{10}$ of a second, and a light modulator failure compensation system for correcting for failure of at least one of the plurality of light modulators, the light modulator failure compensation system having an image shifting module for shifting image position in coordination with periodic displacement of the light modulator array, and a rescaling module to reduce apparent light modulator display intensity for at least some light modulators based on a location of failed light modulators.

14. The fault tolerant display system of claim 13, further comprising a variable intensity light source for increasing light intensity to compensate for reduced apparent light modulator display intensity.

* * * * *